(12) United States Patent
Drexler

(10) Patent No.: US 10,940,931 B2
(45) Date of Patent: Mar. 9, 2021

(54) MICRO-FUSION-POWERED UNMANNED CRAFT

(71) Applicant: Jerome Drexler, Los Altos Hills, CA (US)

(72) Inventor: Jerome Drexler, Los Altos Hills, CA (US)

( * ) Notice: Subject to any disclaimer, the term of this patent is extended or adjusted under 35 U.S.C. 154(b) by 259 days.

(21) Appl. No.: 16/188,694

(22) Filed: Nov. 13, 2018

(65) Prior Publication Data
US 2020/0148324 A1    May 14, 2020

(51) Int. Cl.
| | |
|---|---|
| *B64G 1/36* | (2006.01) |
| *B64B 1/36* | (2006.01) |
| *B64G 1/26* | (2006.01) |
| *G21B 3/00* | (2006.01) |
| *G21H 7/00* | (2006.01) |
| *B64G 1/40* | (2006.01) |

(52) U.S. Cl.
CPC .......... *B64B 1/36* (2013.01); *B64G 1/26* (2013.01); *B64G 1/408* (2013.01); *G21B 3/004* (2013.01); *G21H 7/00* (2013.01)

(58) Field of Classification Search
CPC ........ B64G 1/409; B64G 1/407; B64G 1/408; F03H 3/00; F03H 99/00
See application file for complete search history.

(56) References Cited

U.S. PATENT DOCUMENTS

| | | |
|---|---|---|
| 5,058,833 A | 10/1991 | Carmouche |
| 7,093,794 B2 | 8/2006 | Leyva et al. |

(Continued)

FOREIGN PATENT DOCUMENTS

| | | |
|---|---|---|
| CA | 2153406 A1 | 7/1994 |
| JP | H08211190 A | 8/1996 |

(Continued)

OTHER PUBLICATIONS

Aguilar et al., "Precision Measurement of the Proton Flux in Primary Cosmic Rays from Rigidity 1 GV to 1.8 TV with the Alpha Magnetic Spectrometer on the International Space Station", Physical Review Letters, PRL 114, 171103, May 1, 2015, 9 pages.

(Continued)

*Primary Examiner* — J. Woodrow Eldred
(74) *Attorney, Agent, or Firm* — Thomas Schneck; Mark Protsik

(57) ABSTRACT

A craft having a source of deuterium-containing micro-fusion fuel particles is operable above a planetary, lunar or asteroid surface in the presence of ambient cosmic rays. The fuel particles are dispersible from a set of ports, where at least some of the ports are in an underside of the craft body and others are in lateral sides of the craft body. Dispersed fuel particles interact with ambient cosmic rays and muons to generate energetic reaction products, at least some which are then received by the underside of the craft to generate lift and also selected lateral sides of the craft to generate propulsive thrust in a desired lateral direction. The craft can carry tethers and winches to carry a payload above the surface from location to another. In another embodiment, a balloon-based design, such as a dirigible, provides primary buoyant lift, while the micro-fusion particles provide at least lateral thrust, and supplemental lift where needed.

19 Claims, 3 Drawing Sheets

(56) References Cited

U.S. PATENT DOCUMENTS

| | | | |
|---|---|---|---|
| 8,894,002 B2* | 11/2014 | Goelet | B64B 1/58 244/26 |
| 9,036,765 B2 | 5/2015 | Birnbach | |
| 9,060,412 B2 | 6/2015 | Leiter | |
| 9,068,562 B1 | 6/2015 | Budica | |
| 2006/0126771 A1 | 6/2006 | Da Conceicao | |
| 2008/0061191 A1 | 3/2008 | Gochnour | |
| 2008/0123793 A1 | 5/2008 | Loan et al. | |
| 2009/0000268 A1 | 1/2009 | Yurash | |
| 2010/0012771 A1* | 1/2010 | Jess | B64B 1/36 244/29 |
| 2015/0098543 A1 | 4/2015 | Cohen | |
| 2018/0033496 A1 | 2/2018 | Sedwick | |
| 2020/0299007 A1* | 9/2020 | Bennett | B64G 1/408 |

FOREIGN PATENT DOCUMENTS

| | | |
|---|---|---|
| WO | WO9013125 A1 | 11/1990 |
| WO | WO9222909 A1 | 12/1992 |
| WO | WO2005/001845 A2 | 1/2005 |
| WO | WO2014114986 A1 | 7/2014 |

OTHER PUBLICATIONS

Alvarez et al., "The Catalysis of Nuclear Reactions by mu Mesons", Lawrence Berkeley National Laboratory, Dec. 10, 1956, 5 pages.
Nakamura et al. (revised by Beatty et al.), "Cosmic Rays", JP G 37, 075021, Feb. 16, 2012, 21 pages.
Hassler et al., "Mars' Surface Radiation Environment Measured with the Mars Science Laboratory's Curiosity Rover", Science, Nov. 12, 2013, 35 pages.
Jackson, "A Personal Adventure in Muon-Catalyzed Fusion", Physics in Perspective 12, 2010, pp. 74-88.
Jackson, "Muon Catalysis of Fusion: A Commentary", Lawrence Berkeley Laboratory, Physics Division, Aug. 1984, 12 pages.
Kaye & Laby, NPL, "Cosmic Rays", 4 pages, http://www.kayelaby.npl.co.uk/general_physics/2_7/2_7_7.html.
Kaye & Laby, NPL, "Nuclear Fusion", 9 pages, http://www.kayelaby.npl.co.uk/atomic_and_nuclear_physics/4_7/4_7_4.html.
Cucinotta et al., "Space Radiation Cancer Risk Projections and Uncertainties—2012", NASA/TP-2013-217375, Jan. 2013, chapter 2—pp. 9-41.
Nuclear Power, "Photoneutrons", Nov. 3, 2015, 3 pages, https://www.nuclear-power.net/nuclear-power/fission/delayed-neutrons/photoneutrons/>.
U.C. Berkeley Physics 250, "Cosmic Rays", Neutrino/Nuclear Astrophysics, Spring 2011, Class Notes, Chapter 9, pp. 1-36, availble from Univ. of Washington, www.int.washington.edu./PHYS554/2011/chapter9_11.pdf.
J.C. Berkeley Physics 250, "Cosmic Rays", Neutrino/Nuclear Astrophysics, Spring 2011, Class Notes, Chapter 9, pp. 1-36, available from Univ. of Washington, www.int.washington.edu/PHYS554/2011/chapter9_11.pdf.
Wikipedia, "Space Rider", https://en.wikipedia.org/w/index.php?title=Space_Rider&oldid=832299531, Mar. 25, 2018, 2 pages.
Wikipedia, "Programme for Reusable In-Orbit Demonstrator in Europe", https://en.wikipedia.org/w/index.php?title=Programme_for_Reusable_In-orbit_Demonstrator_in-Europe&oldid=832299608, Mar. 25, 2018, 2 pages.
Wikipedia, "Boom Technology", https://en.wikipedia.org/w/index.php?title=Boom_Technology&oldid=840078334, May 7, 2018, 4 pages.
Wikipedia, "SpaceShipTwo", https://en.wikipedia.org/w/index.php?title=SpaceShipTwo&oldid=839887457, May 6, 2018, 12 pages.
Wikipedia, "Airbus Defence and Space Spaceplane", https://en.wikipedia.org/w/index.php?tilte=Airbus_Defence_and_Space_Spaceplane&oldid=796930609, Aug. 23, 2017, 5 pages.
Wikipedia, "New Shepard", https://en.wikipedia.org/w/index.php?title=New_Shepard&oldid=839523764, May 4, 2018, 10 pages.
Wikipedia, "Boeing X-37", https://en.wikipedia.org/w/index.php?title=Boeing, X-37&oldid=840649057, May 11, 2018, 12 pages.
Wikipedia, "Dream Chaser", https://en.wikipedia.org/w/index.php?title=Dream_Chaser&oldid=840493574, May 10, 2018, 14 pages.
Wikipedia, "Skylon (spacecraft)", https://en.wikipedia.org/w/index.php?title=Skylon_(spacecraft)&oldid=837622684, Apr. 22, 2018, 12 pages.
Beals et al., "Project Longshot: An Unmanned Probe to Alpha Centauri", U.S. Naval Academy, Report for 1987-1988, 74 pages.
J.J. Hopkins Laboratory for Pure and Applied Science, General Atomic division of General Dynamics, "Nuclear Pulse Space Vehicle Study", Chapter 2, Sep. 19, 1964, 30 pages.
Martin et al., "Project Daedalus: The Propulsion System—Part 1: Theoretical Considerations and Calculations", 1978, scan copy, 49 pages.
Schmidt et al., "Nuclear Pulse Propulsion—Orion and Beyond", 36th AIAA/ASME/SAE/ASEE Joint Propulsion Conference & Exhibit, Jul. 16-19, 2000, https:/ntrs.nasa.gov/archive/nasa/casi.ntrs.nasa.gov/20000096503.pdf>.
SpaceX, "First-stage landing—Onboard camera", YouTube, May 27, 2016, 1 page, https:youtu.be/4jEz03Z8azc>.
S.Cecchini et al., "Cosmic Ray Muon Physics", abstract, 18 pages.
N.Ramesh et al., "Flux Variation of Cosmic Muons", Journal of the Arkansas Academy of Science, vol. 65, 2011, 5 pgs.
Wikipedia—Space Tether, 12 pages.

* cited by examiner

MICRO-FUSION-POWERED UNMANNED CRAFT

TECHNICAL FIELD

The present invention relates to robotic or remotely-operated unmanned aircraft or drones, as well as related robotic spacecraft, both for aerial or space observation and reconnaissance, and for cargo or payload delivery from one location to another, and especially to such craft for use over the surfaces of the Moon, Mars, other planets or moons, as well as asteroids and similar space bodies. The invention also relates to inducement or production of controlled nuclear fusion by particle-target and muon-catalyzed micro-fusion for thrust in the presence of ambient cosmic rays and muons.

BACKGROUND ART

Remotely-piloted aircraft, unmanned aerial vehicles or "drones", with various degrees of autonomy, are widely known for both military and civilian uses. These include the large General Atomics MQ-1 Predator and MQ-9 Reaper for border-control surveillance and also military uses. They also include much smaller civilian craft for scientific research, agriculture/ranching, surveying, law enforcement support, commercial package delivery, and even as toys.

Some ultra-lightweight and lightweight craft up to 25 kg can provide lift for up to 10-15 kg payload and are potentially suitable for package delivery. These small craft are usually electrically powered with typical ranges at present of about 5 km, and with flight times typically about 16 to 20 minutes, but up to 30 to 45 minutes in a few cases, before needing battery replacement or recharging. In some models, helicopter-style rotor blades have speeds of 12000 to 20000 rpm to provide lift and forward motion. Total engine power to weight for these lightweight craft is typically on the order of 2 kW/kg, but this can vary about fivefold.

For future creation of bases on the Moon and eventually on Mars, there will be a need to efficiently move items from place to place. Surface transport may sometimes be difficult because of terrain. However, there is no atmosphere on the Moon to support aerial flight, so another means of providing thrust and lift must be used. Although Mars does have an atmosphere, it is extremely thin (an average of 600 Pascals or only 0.6% of Earth's atmospheric pressure), and while gravity is only about 38% of that on Earth, aerial-style flight will be extremely difficult (e.g. number and length of rotor blades and their speeds would collectively need to increase about 60-fold for comparable lift).

Muon-catalyzed fusion was observed by chance in late 1956 by Luis Alvarez and colleagues during evaluation of liquid-hydrogen bubble chamber images as part of accelerator-based particle decay studies. These were rare proton-deuteron fusion events that only occurred because of the natural presence of a tiny amount of deuterium (about one part per 6400) in the liquid hydrogen. It was quickly recognized that fusion many orders of magnitude larger would occur with either pure deuterium or a deuterium-tritium mixture. However, John D. Jackson (Lawrence Berkeley Laboratory and Prof. Emeritus of Physics, Univ. of California, Berkeley) correctly noted that for useful power production there would need to be an energetically cheap way of producing muons. The energy expense of generating muons artificially in particle accelerators combined with their short lifetimes has limited its viability as an earth-based fusion source, since it falls short of break-even potential.

Another controlled fusion technique is particle-target fusion which comes from accelerating a particle to sufficient energy to overcome the Coulomb barrier and interact with target nuclei. To date, proposals in this area depend upon using some kind of particle accelerator. Although some fusion events can be observed with as little as 10 KeV acceleration, fusion cross-sections are sufficiently low that accelerator-based particle-target fusion are inefficient and fall short of break-even potential.

It is known that cosmic rays are abundant in interplanetary space. Cosmic rays are mainly high-energy protons (with some high-energy helium nuclei as well) with kinetic energies in excess of 300 MeV. Most cosmic rays have GeV energy levels, although some extremely energetic ones can exceed $10^{18}$ eV. FIG. 4 shows cosmic ray flux distribution at the Earth's surface after significant absorption by Earth's atmosphere. In near-Earth space, the alpha magnetic spectrometer (AMS-02) instrument aboard the International Space Station since 2011 has recorded an average of 45 million fast cosmic ray particles daily (approx. 500 per second within that instrument's effective acceptance area and measurement energy range). The overall flux of galactic cosmic ray protons (above Earth's atmosphere) can range from a minimum of 1200 $m^{-2}s^{-1}sr^{-1}$ to as much as twice that amount. (The flux of galactic cosmic rays entering our solar system, while generally steady, has been observed to vary by a factor of about 2 over an 11-year cycle according to the magnetic strength of the heliosphere.) In regions that are outside of Earth's protective magnetic field (e.g. in interplanetary space), the cosmic ray flux is expected to be several orders of magnitude greater. As measured by the Martian Radiation Experiment (MARIE) aboard the Mars Odyssey spacecraft, average in-orbit cosmic ray doses were about 400-500 mSv per year, which is an order of magnitude higher than on Earth.

Cosmic rays are known to generate abundant muons from the decay of cosmic rays passing through Earth's atmosphere. Cosmic rays lose energy upon collisions with atmospheric dust, and to a lesser extent atoms or molecules, generating elementary particles, including pions and then muons, usually within a penetration distance of a few cm. Typically, hundreds of muons are generated per cosmic ray particle from successive collisions. Near sea level on Earth, the flux of muons generated by the cosmic rays' interaction by the atmosphere averages about 70 $m^{-2}s^{-1}sr^{-1}$. The muon flux is even higher in the upper atmosphere. These relatively low flux levels on Earth reflect the fact that both Earth's atmosphere and geomagnetic field substantially shields our planet from cosmic ray radiation. Mars is a different story, having very little atmosphere (only 0.6% of Earth's pressure) and no magnetic field, so that muon generation at Mars' surface is expected to be very much higher than on Earth's surface.

SUMMARY DISCLOSURE

The present invention provides micro-fusion powered craft for use above the lunar and Martian surfaces, where the micro-fusion provides retro-thrust or electrical power for generating lift and propulsion. The propulsion technology takes advantage of the abundance of cosmic rays in space to catalyze fusion events in enough amounts to produce usable thrust. The cosmic rays together with muons generated from such cosmic rays are available here for free and do not need to be generated artificially in an accelerator. The thrust enables flight above the lunar or planetary surface, including an ability to haul cargo up to some maximum weight dependent upon the amount of lift and propulsion provided by the micro-fusion. In another embodiment, on planets with an atmosphere (such as Mars), a dirigible or other balloon-based design could provide the primary lift, while the micro-fusion provides the forward propulsion as well as any needed supplemental lift, thereby allowing heavier loads to be transported.

A craft is provided with a set of underside ports that downwardly eject deuterium-containing micro-fusion fuel material. This material interacts with ambient cosmic rays and/or muons to generate energetic alpha particles and/or other reaction products that provide lifting thrust to the craft. The craft is also provided with a set of side ports. Deuterium-containing micro-fusion fuel material is ejected from one or more selected ports to form a cloud of material that interacts with the ambient cosmic rays and/or muons. Energetic micro-fusion reaction products interact with the side of the craft to provide lateral thrust moving the craft in a desired direction. The craft may be provided with tethers and winches to transport a load from one location to another above a planetary, lunar or asteroid surface.

DETAILED DESCRIPTION

Figure 1:
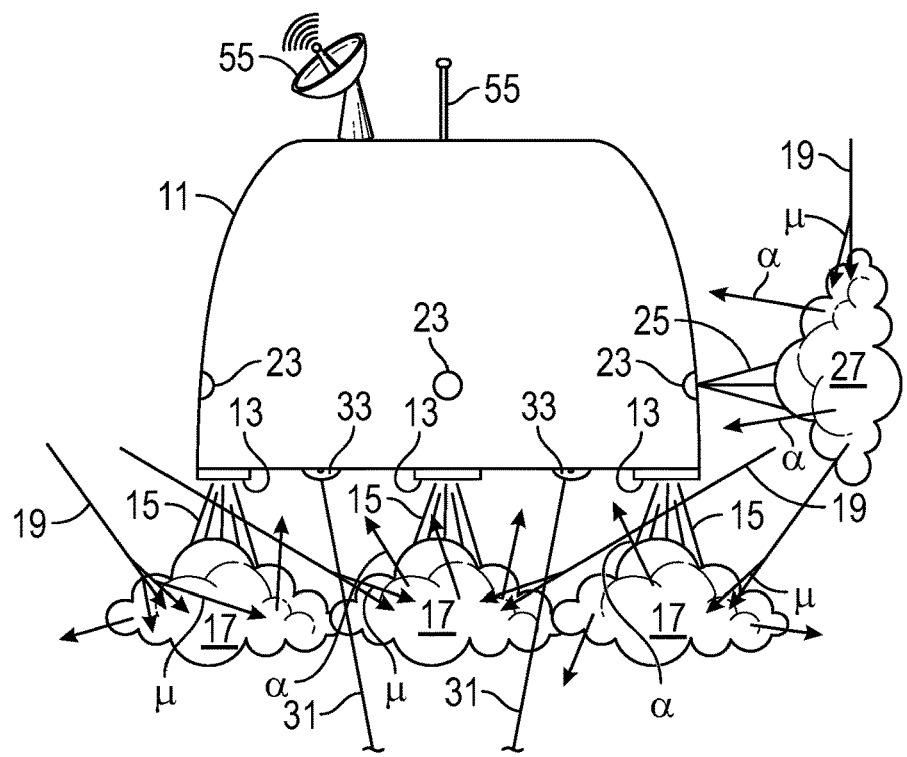
FIG. 1 is a schematic side view showing an embodiment of a craft for operation above a planet's or moon's surface in the presence of ambient cosmic rays and muons and having micro-fusion generated thrust for lift and propulsion.

With reference to FIG. 1, a craft 11 has a set of lower ports 13 for ejecting micro-fusion particles 15 downward to create a cloud 17 of such material. Ambient cosmic rays 19 and muons µ generated from those cosmic rays react with the cloud 17 of micro-fusion material to generate energetic fusion products, such as alpha particles α. At least some of these energetic fusion products are received by the craft 11 to provide upward thrust or lift. The craft 11 also has a set of side ports 23 located at various places around the craft. Selected side ports 23 eject micro-fusion particle material 25 to form a cloud 27 that likewise interacts with the ambient cosmic rays 19 and muons µ to produce energetic micro-fusion products, such as alpha particles α, at least some of which are then received by that side of the craft 11 to provide lateral thrust in a desired direction. Selection of one or more side ports 23 change the direction of lateral movement. Alternatively, if the craft can rotate, then fewer side ports 23 may be needed to achieve the same range of desired lateral movement. The craft 11 may also have a set of tethers 31 (here, two of them are shown), which may be attached at the vehicle end to winches 33 and attached at a lower end (not shown) to a payload receptacle or the payload itself.

Figure 2:
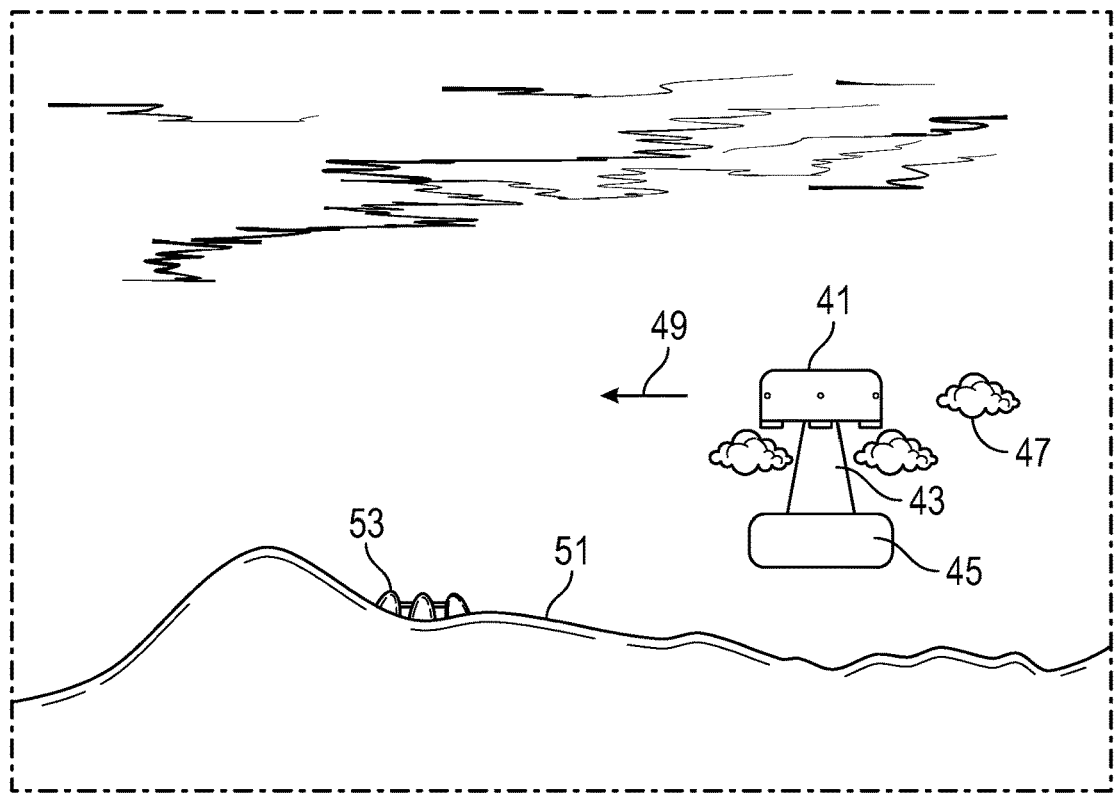
FIG. 2 is a schematic side view showing use of a craft such that in FIG. 1 for transport of cargo.

As seen in FIG. 2, a craft 41 is seen with tethers 43 holding a receptacle 45 with a payload. Clouds of micro-fusion particle material 47 are ejected from the craft 41 to provide lift and forward propulsion in a direction 49. The craft 41 travels above the surface 51 of a planet, moon, asteroid or other space body, e.g. toward a base 53 to which the payload is being delivered.

In addition to delivery of payload material to some desired destination, micro-fusion-powered crafts of this sort can be used for overhead observation or reconnaissance of the planetary or lunar surface. The crafts can either hover above a stationary location (e.g. when only the lower ports are used to create lift) or move in a regular search pattern over the surface (e.g. using the side ports to create propulsion). The weight of such vehicles can often be less than 5 kg, so that it doesn't need much lifting thrust to remain airborne at a specified altitude above the lunar or planetary surface for reconnaissance purposes. The thrust-to-weight will be approximately 1 to achieve stable altitude but can be increased or decreased several-fold as needed to gain or lower the craft's altitude.

The fuel can be solid $Li^6D$ in powder form, D-D or D-T inertial-confinement-fusion-type pellets, or $D_2O$ ice crystals, or even droplets of (initially liquid) $D_2$. Various types of micro-fusion reactions may also occur, such as $Li^6$-D reactions, generally from direct cosmic ray collisions, as well as D-T, using tritium generated by cosmic rays impacting the lithium-6. D-T reactions especially may be assisted by muon-catalyzed fusion.

The dispersed cloud of micro-fusion target material will be exposed to ambient cosmic rays and muons. To assist muon formation, the micro-fusion fuel material may contain up to 20% by weight of added particles of fine sand or dust. As cosmic rays collide with the micro-fusion material and dust, they form muons µ that are captured by the deuterium and that catalyze fusion. Likewise, the cosmic ray collisions themselves can directly trigger particle-target micro-fusion.

The amount of energy generated by the micro-fusion reactions, and the thrust the micro-fusion products produce, depends upon the quantity of fuel released and the quantity of available cosmic rays and muons in the ambient environment surrounding the craft. Assuming most of the energy can be captured and made available for thrust, an estimated $10^{15}$ individual micro-fusion reactions (less than 1 µg of fuel consumed) per second would be required for 1 kW output. But as each cosmic ray can create hundreds of muons and each muon can catalyze about 100 reactions, the available cosmic ray flux in interplanetary space (known to be several orders of magnitude greater than on Earth) is believed to be sufficient for this thrust purpose following research, development, and engineering efforts.

The micro-fusion fuel material may be sprayed continuously as needed to sustain the cloud underneath the craft, or alternatively can be shot out as a series of small projectiles containing the micro-fusion target material, e.g. once every minute or more frequently. The projectiles would then chemically explode when it reaches a desired distance from the craft to disperse its micro-fusion particle fuel load and create the cloud. A hovering craft would perhaps need less fuel for creating lift since the cloud will tend to remain longer below the craft until it eventually disperses. A moving craft should have its lift generating material sprayed or shot below but slightly ahead of the craft to remain under the craft for a longer time as the craft moves over the cloud. The amount of micro-fusion target material expended is still quite small, since less than 1 µg of fuel material reacted per second would be required for 1 kW output. Exact amount of fuel needed will depend upon the ambient cosmic ray and muon flux and the reaction cross-sections for achieving the desired number (e.g. $10^{15}$) of reactions per second.

The volume of the continuous slow fusion creates high velocity fusion products (fast alpha particles or helium "wind", etc.) that bombard the exterior of the craft. The energetic alpha particle micro-fusion products (α) provide thrust against the craft. If needed a large-diameter flat disc or pressure plate can be mounted on the craft to receive the fusion products α to maximize thrusting from such direct interactions with the fusion products. Even the photon radiation generated in the micro-fusion reactions will apply some supplemental thrusting pressure to the craft.

Stored fuel will be shielded within the craft to reduce or eliminate premature micro-fusion events until delivered and dispersed as a cloud outside the craft for thrusting. However, one need not eliminate cosmic rays or their secondary particles (pions, muons, etc.) to zero, but merely reduce their numbers and energies sufficiently to keep them from catalyzing large numbers of micro-fusion events in the stored target particle material.

The muon-catalyzed and direct particle-target micro-fusion for providing the thrust may be used on the Moon, Mars, Martian moons, or even possibly asteroids. Simple, inexpensive observation drones can be operated at a variety of altitudes and speeds. The design can be optimized for the particular space body. Specifically, as in FIG. 1, each craft could have two sources of micro-fusion thrust: one to achieve and maintain altitude, and at least one other to provide horizontal motion. Craft designs might typically comprise stacked discs (e.g. 3 to 6), each performing some dedicated function of the craft. In FIG. 1, an upper most portion of the craft might be dedicated to holding communication equipment (antennae and dishes) 55, especially if the craft 11 is intended to be remotely-operated. Other portions of the craft would likely hold sensors and other observational equipment.

Because the technology is still early in a developmental phase, testing of its concepts might be perfected on Earth before deployment in outer space, even though the ambient flux of cosmic rays and muons is several orders of magnitude lower due to Earth's geomagnetic field and thick atmosphere. For testing purposes, ultra-lightweight craft under 5 kg may be used, especially at higher altitudes. (Both cosmic ray flux and muon flux are known to substantially increase with altitude.) Testing with ultra-lightweight craft at convenient higher altitude Earth locations would allow designers to improve the proposed micro-fusion engines before their use on the Moon and then on Mars.

When used on Earth, some care will be needed when using some micro-fusion fuels. For example, lithium hydride (including $Li^6D$) is known to be violently chemically reactive in the presence of water. While reactions with water are not a problem on the Moon or Mars, with any Earth applications the fuel material will need to be encapsulated to isolate it from water sources, including atmospheric vapor. A desiccant can also be used when storing the fuel material.

Micro-fusion powered craft can also serve a role in asteroid mining applications, e.g. to supply deliveries to an asteroid mining base camp, or to move ore samples from an asteroid mining site to the base camp (or to a nearby tethered or orbiting spacecraft) for evaluation. In high muon and cosmic ray environments, there may even be enough thrust for lifting and moving equipment from place to place.

Figure 3:
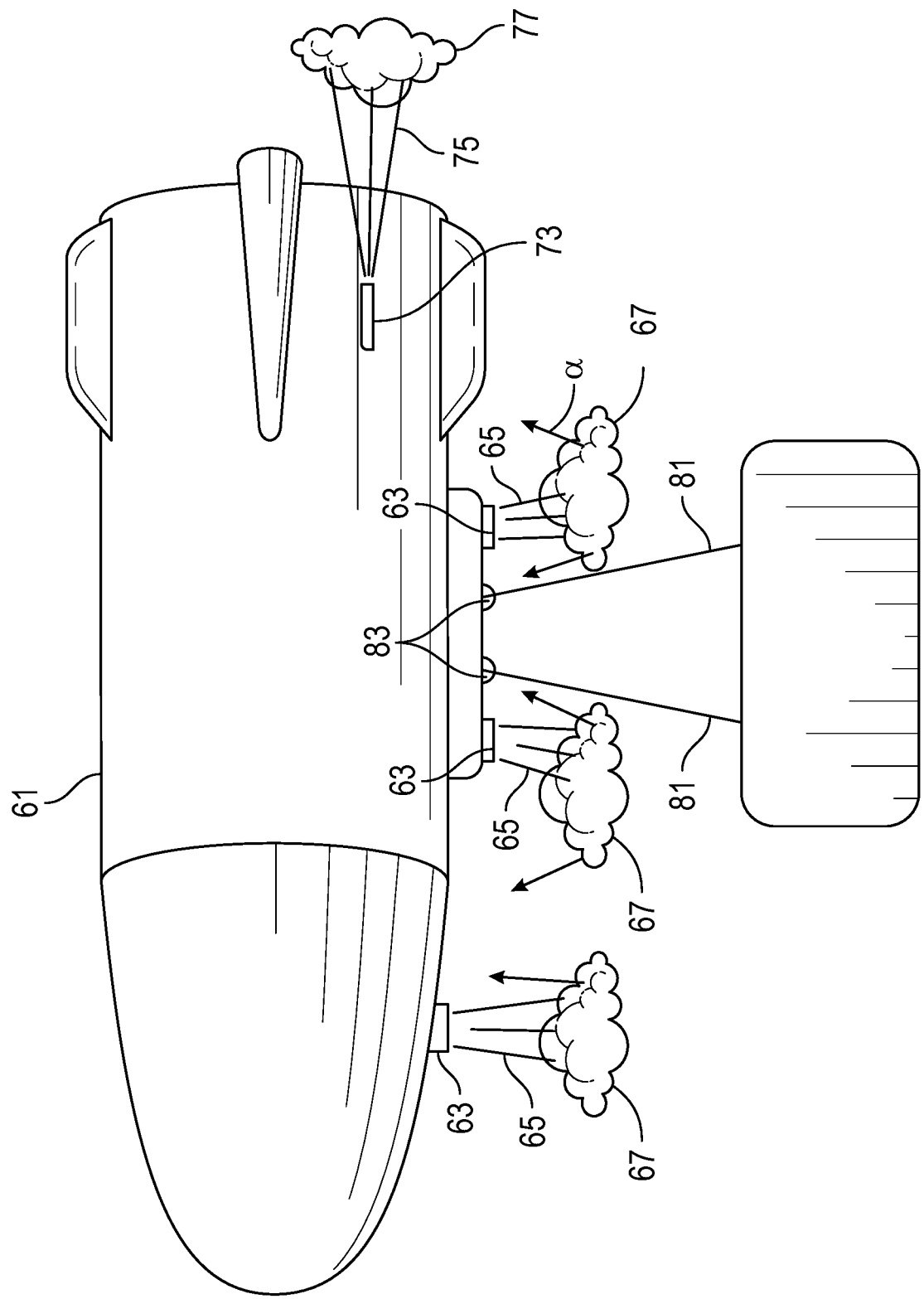
FIG. 3 is a schematic side view showing an alternate embodiment of a craft having a balloon-based design, such as a dirigible, for primary lift and with micro-fusion generated propulsion and supplemental lift.
Figure 4:
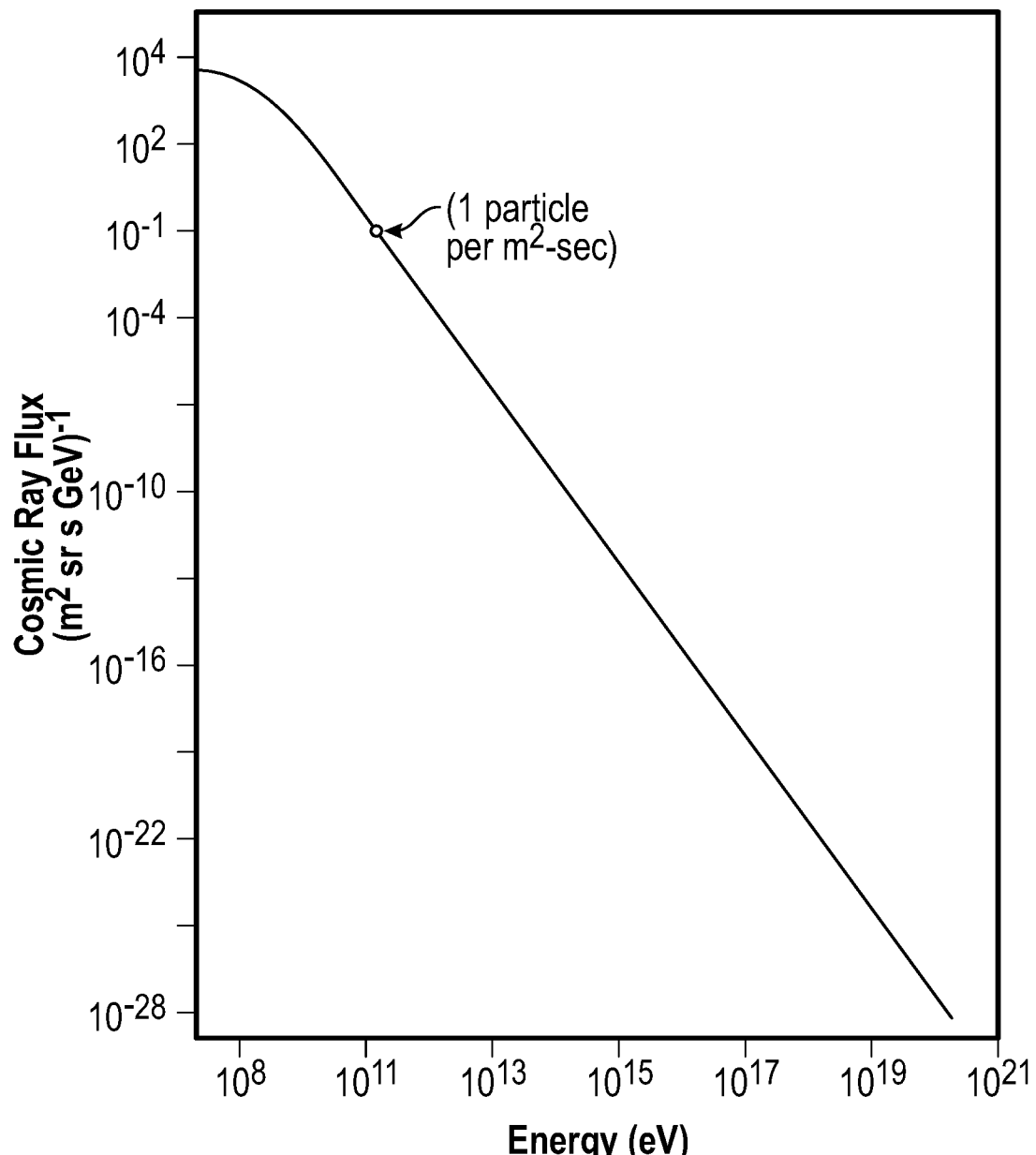
FIG. 4 is a graph of cosmic ray flux at the Earth surface versus cosmic ray energy, after very significant cosmic ray absorption by Earth's atmosphere has occurred.

Similar local resource extraction activities are anticipated at Mars colonies. On Mars, there is an additional benefit of some atmosphere such that a balloon-type craft design, such as a dirigible, can be used for primary lift. The key requirement is that the gas contained within the interior of the balloon or dirigible be a lower density in relation to the exterior atmosphere. As reaction with oxygen is less of a danger on Mars and hydrogen can readily be extracted from Martian water ice, hydrogen can be used as the dirigible gas. As seen in FIG. 3, such a balloon-based design has an exterior surface 61 that contains within it the hydrogen gas at the same pressure as the Martian atmosphere (or a lesser pressure if the dirigible or balloon surface material is sufficiently rigid). This provides lift or reduces the need for lift from micro-fusion. If the load being carried is especially heavy, underside ports 63 can disperse micro-fusion fuel 65 to form a cloud 67 that reacts with ambient cosmic rays and muons as before. The energetic micro-fusion reaction products (primarily alpha particles) are received by the craft 61 to achieve additional secondary lifting thrust beyond that provided primarily by the dirigible's buoyancy. In either case, whether micro-fusion lift is needed or not, side ports 73 disperse micro-fusion fuel 75 to form a cloud 77 that again reacts with cosmic rays and muons to generate lateral propulsive thrust to move the craft 61 toward its destination. Again, a set of tethers 81 connected to the craft 61 via corresponding winches 83 can hold a load beneath the dirigible craft 61 or other balloon-based craft.

In a similar application, a balloon-based design could be filled with hydrogen (or helium) and used to raise a small lightweight remotely-piloted (or autonomous) aerial vehicle or drone to an altitude where a planet's cosmic ray and muon flux are at useful levels for achieving micro-fusion thrust. Once that altitude is reached, the balloon may be cut loose (or vented, hauled-in and stored for future use) and the micro-fusion thrust engine started as in FIG. 1.

Helicopter-style aerial vehicles, because of their many moving parts, are prone to failure and crashes. (This susceptibility is likely to be amplified if employed on Mars because the rotor blades will need to move even faster in the much lighter atmosphere.) In the presence of an adequate flux of cosmic rays and muons, the micro-fusion thrusting can be used as an emergency backup to slow the fall of a failing helicopter and soften any crash landing. Thus, it could serve as a safety feature with potential to save lives.

Micro-fusion powered spacecraft with role as a space taxi or crew transfer vehicle, or for cargo delivery, can link up with an orbiting spacecraft. The micro-fusion thrust from a vehicle like that in FIG. 1 can possibly ascend from the Martian surface to one or both of its moons (Phobos and Deimos). Similarly, in the asteroid belt, short voyages between two nearby asteroids might be possible. Also, micro-fusion propulsion can be use for spacecraft maneuvering, collision avoidance, and orbital station-keeping.

What is claimed is:

1. A craft operable above a lunar or asteroid surface in the presence of ambient cosmic rays, comprising:
    a craft body having therein a source of deuterium-containing micro-fusion fuel particles, the total mass of the craft including fuel being at most 25 kilograms, the fuel particles being dispersible from a set of ports in the craft body, at least some of the ports being in an underside of the craft body and at least others of the ports being in lateral sides of the craft body, dispersed fuel particles interacting with ambient cosmic rays and muons produced from the cosmic rays to generate energetic reaction products, at least some of the reaction products being received by the underside of the craft body to generate lift and at least some of the reaction products being received by selected lateral sides of the craft body to generate propulsive thrust of the craft body in a desired lateral direction.

2. The craft as in claim 1, wherein a set of tethers are attached to the craft body for carrying a load of up to 15 kilograms.

3. The craft as in claim 2, wherein the tethers are deployed by a set of winches on the craft body.

4. The craft as in claim 1, wherein the craft body includes communication equipment for receiving remote piloting instructions.

5. The craft as in claim 1, wherein the craft body further includes observational equipment and sensors.

6. The craft as in claim 1, wherein the deuterium-containing particle fuel material comprises $Li^6D$.

7. The craft as in claim 1, wherein the deuterium-containing particle fuel material comprises $D_2O$.

8. The craft as in claim 1, wherein the deuterium-containing particle fuel material comprises $D_2$.

9. The craft as in claim 1, wherein the deuterium-containing particle fuel material is in solid powder form.

10. The craft as in claim 1, wherein the deuterium-containing particle fuel material is in solid chip or pellet form.

11. The craft as in claim 1, wherein the deuterium-containing particle fuel material is encapsulated to isolate the material from ambient sources of water.

12. The craft as in claim 1, wherein the deuterium-containing particle fuel material is in frozen form.

13. The craft as in claim 1, wherein the deuterium-containing particle fuel material is in liquid droplet form.

14. The craft as in claim 1, wherein the deuterium-containing particle fuel material also contains up to 20% by weight of added particles of fine sand or dust.

15. A craft operable above a surface of a planet having an atmosphere in the presence of ambient cosmic rays and muons, comprising:
   a balloon-type body containing a gas or near vacuum within an interior with a density of less than a planetary atmosphere outside the balloon-type body so as to provide buoyant lift;
   a source of deuterium-containing micro-fusion fuel particles carried by the balloon-type body, the fuel particles being dispersible from a set of ports in the balloon-type body, at least some of the ports being in lateral sides of the balloon-type body, dispersed fuel particles interacting with ambient cosmic rays and muons produced from the cosmic rays to generate energetic reaction products, at least some of the reaction products being received by selected lateral sides of the balloon-type body to generate propulsive thrust in a desired lateral direction.

16. The craft as in claim 15, wherein the balloon-type body comprises a dirigible.

17. The craft as in claim 15, wherein at least some of the ports are on an underside of the balloon-type body and at least some of the reaction products being received by the underside of the balloon-type body to generate supplemental lift in addition to the buoyancy lift of the balloon-type body.

18. The craft as in claim 15, wherein a set of tethers are attached to the balloon-type body for carrying a load.

19. The craft as in claim 18, wherein the tethers are deployed by a set of winches on the balloon-type body.

* * * * *